March 31, 1970    R. M. MULLER    3,503,675
VARIABLE MAGNIFICATION STEREO OPTICAL SYSTEM
Filed Dec. 26, 1967

| LENS | $N_D$ | $V$ | $T$ | $R$ |
|---|---|---|---|---|
| L1A | 1.50795 | 61.1 | 3.537 | $R_1 = +35.190$ |
| L1B | 1.7506 | 27.8 | 1.618 | $R_2 = -16.130$ / $R_3 = -29.950$ |
| L2A | 1.7506 | 27.8 | 1.361 | $R_4 = -10.177$ |
| L2B | 1.50795 | 61.1 | .905 | $R_5 = -6.156$ / $R_6 = +17.430$ |
| L3A | 1.50795 | 61.1 | 4.657 | $R_7 = +90.780$ |
| L3B | 1.720 | 29.3 | 1.701 | $R_8 = -14.370$ / $R_9 = -24.235$ |

INVENTOR.
ROBERT M. MULLER
BY
Amster & Rothstein
ATTORNEYS 3,503,675
Patented Mar. 31, 1970

1

3,503,675
VARIABLE MAGNIFICATION STEREO OPTICAL SYSTEM
Robert M. Muller, Cheektowaga, N.Y., assignor to American Optical Corporation, Southbridge, Mass., a corporation of Delaware
Filed Dec. 26, 1967, Ser. No. 693,502
Int. Cl. G02b 15/16
U.S. Cl. 350—184    5 Claims

ABSTRACT OF THE DISCLOSURE

A continuously variable magnification stereo optical system including two identical optical sub-systems, the axes of which intersect at an acute angle. Along each axis there is one fixed lens element and two lens elements which are movable relative to one another and to the fixed lens element. Each lens element is a cemented doublet. The particular characteristics of all the doublets, including their radii, thicknesses, refractive indices and dispersions, result in a system having well corrected aberrations over the entire magnification range while still achieving the desired continuously variable magnification function.

---

This invention relates to a continuously variable magnification optical system especially well suited for a stereomicroscope, and more particularly to such an optical system for the objective section of a stereomicroscope having an object positioned at a substantially fixed distance from the image plane of the microscope.

In a stereomicroscope there is generally provided an optical system comprising identical optical sub-systems which are inclined to each other at an acute angle so that the image plane of each system is inclined with respect to the specimen stage. In one of the simpler types of such an optical system adapted for continuously variable magnification with fixed object and image planes, such as that disclosed in Schuma, Patent No. 3,057,259, issued Oct. 9, 1962, there are provided three cemented doublets along each optical axis. These include a positive lens doublet that is closest to the object and which is held stationary, and another positive lens doublet and a negative lens doublet therebetween, the latter two doublets being moved axially with respect to each other and the stationary lens doublet. The movable positive and negative lens doublets are shifted along their respective axes at different rates in order that the magnification of the system be continuously variable and that the image plane be held fixed. Typically, a doubly-grooved barrel is associated with each axis and both barrels are rotated in common by rotation of a control knob. The two movable lens doublets on each axis are linked to cam followers which ride in the barrel grooves in order that the magnification be varied in accordance with the movement of the control knob. An improved mechanical structure, which is especially suitable for providing the proper mechanical functioning of the optical system of the present invention, is disclosed in the copending application of Olin W. Boughton, Ser. No. 681,968, filed contemporaneously herewith and assigned to the assignee of this application.

Doublets as described above are used rather than singlets to correct to a sufficient extent the aberrations which would be introduced by single lens elements. In order to keep the cost of a stereomicroscope of the type well suited for student use at a commercially acceptable level, it is the general practice to provide only three doublets along each axis in such stereomicroscope.

It is the major object of this invention to provide for a stereomicroscope, a continuously variable magnification objective optical system with fixed image and object planes in which by the use of three specific lens doublets along each optical axis of the system, sufficient correction for aberrations is achieved while obtaining a desired magnification range, a desired field and desired numerical apertures.

Other objects, features and advantages of my invention will become apparent upon consideration of the following detailed description in conjunction with the drawing, in which.

Figure 1:
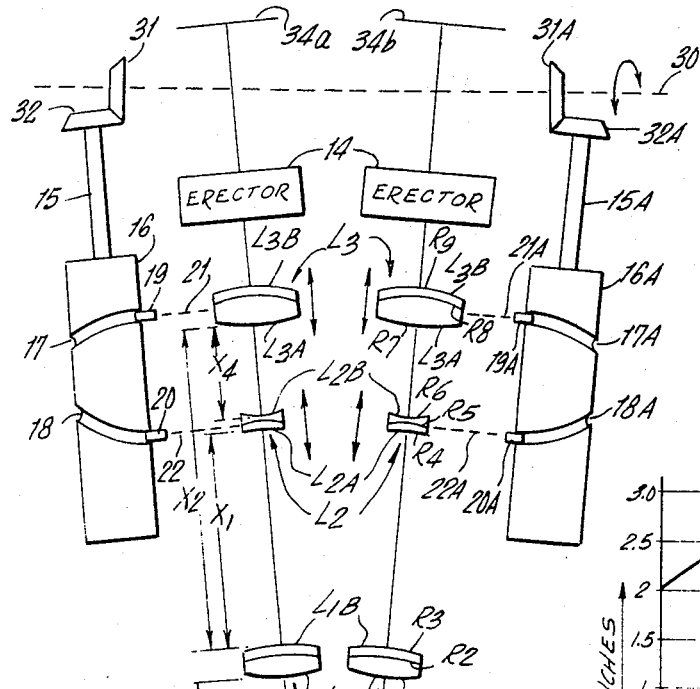
FIG. 1 depicts schematically the optical system of my invention.

The optical system of FIG. 1 is shown only schematically since the mechanical aspects thereof do not form a part of the present invention. A mechanical structure particularly suitable for use with the optical system of the present invention is that disclosed in the above-identified Boughton patent application.

Referring now in detail to FIG. 1, an optical arrangement is shown having an optical system 8 for the objective section of a stereomicroscope. In an actually constructed instrument embodying the invention of the present application, means are provided for vertically adjusting the optical system 8 with reference to a specimen stage so that the object plane lies in the desired plane of view of the specimen. However, such an arrangement forms no part of the present invention and such means are well known in the art. Further, the terms "stationary" or "fixed" as hereinafter used means stationary and fixed subsequent to initial vertical adjustment of the optical system.

The specimen stage of the system is designated by the reference numeral 10. The system 8 includes two linear optical axes 11, 12, with object planes 13, 15, respectively. The axes diverge from the stage 10 at an acute angle of ten degrees, the two axes intersecting at a point P on the specimen stage. The object planes 13, 15 intersect at this point. Because the optical axes 11 and 12 are inclined to each other at said acute angle, this yielding a desired degree of stereoscopy, the respective object planes for each of the optical axes are inclined to the specimen stage at an angle of 5° thereto. The optical system is arranged so that the stage 10 is located at an essentially constant distance from the image planes 34a and 34b of each axis. Along each axis there are disposed three lens elements $L_1$, $L_2$ and $L_3$. Each lens element is a cemented doublet, the two individual lenses of each doublet being identified by the subscripts A and B. The lens elements along the optical axis 11 find identical counterparts in the lens elements along the optical axis 12, and the lens elements along each optical axis comprise identical optical subsystems. Accordingly, only the lens elements along the optical axis 11 will be described in detail.

Positive lens element $L_1$ is stationary and fixed with respect to the object plane 13. Negative lens element $L_2$ and positive lens element $L_3$ are movable along the axis 11 relative to one another and to the fixed lens element $L_1$. The two lens elements $L_2$, $L_3$ are shifted along the axis 11 by an associated barrel 16 having two circumferential camming grooves 17, 18 formed therein. Specifically, barrel 16 is axially mounted on shaft 15 which is driven by a bevel gear assembly comprising gears 31 and 32. Gear 31 is on axis 30 as is the bevel gear 31A of the other optical sub-system. Both of these gears are mounted on a common shaft (not shown) which is in turn driven by a control knob (not shown).

Lens element $L_2$ is mechanically linked to a cam follower 20, the linkage being indicated symbolically by the dotted line 22. Cam follower 20 rides in the cam groove 18 in barrel 16 and as barrel 16 is rotated in either direction by the control knob and the bevel gears, the lens element $L_2$ is shifted along the optical axis 11. Similarly, with respect to the optical axis 11, lens element $L_3$ is linked, as shown at 21, to a cam follower 19 which rides in the cam groove 17 on barrel 16 and moves in the same manner as lens element $L_2$. Lenses with the same reference numerals also move along optical axis 12 as a result of the cooperation of elements 15A through 22A, 31A and 32A. The displacements of lens elements $L_2$, $L_3$ at different rates and as a function of the angular rotation of barrels 16 and 16A are, of course, controlled by the grooves 17, 18 and 17A, 18A.

The magnification of the lens element $L_1$ is essentially constant. The magnification of the lens element $L_3$ varies to a relatively small extent. Most of the variation in the magnification of the system occurs from the variation in the magnification of the lens element $L_2$. The lens element $L_2$ is essentially a magnification changer and the lens element $L_3$ is a focus corrector.

The following table sets forth the magnifications of the three lens elements $L_1$, $L_2$ and $L_3$ for various magnifications of the entire system. In said table, the system magnification is designated $Ms$, while $M_1$, $M_2$ and $M_3$ designate the magnifications of the elements $L_1$, $L_2$ and $L_3$, respectively.

| Ms | $M_1$ | $M_2$ | $M_3$ |
| --- | --- | --- | --- |
| −.7 | −.61401 | −.39875 | −2.85907 |
| −.96 | −.61401 | −.59620 | −2.62246 |
| −1.11189 | −.61401 | −.70600 | −2.56499 |
| −1.54611 | −.61401 | −1 | −2.51807 |
| −1.966 | −.61401 | −1.26083 | −2.53954 |
| −2.5 | −.61401 | −1.56798 | −2.59674 |
| −3.00 | −.61401 | −1.83496 | −2.66270 |

With lens element $L_1$ stationary, the positions of lens elements $L_2$ and $L_3$ with respect to each other and to lens element $L_1$ can be determined for each angular position of barrel 16.

Figure 3:
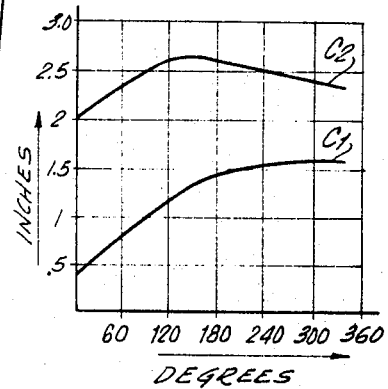
FIG. 3 is a graph illustrating the relative movement of the movable lens elements relative to the fixed lens element.

The foregoing is depicted in the graph of FIG. 3, wherein the abscissa represents the angular rotation of the barrel and the ordinate represents displacement along the optical axis. Curve $C_1$ describes the distance $X_1$ (see FIG. 1) of the lens element $L_2$ from the fixed lens element $L_1$ throughout the angular rotation of the barrel, and curve $C_2$ describes the distance $X_2$ (see FIG. 1) from the lens element $L_3$ to the lens element $L_1$ throughout the same angular rotation. The axial distance $X_3$ separating lens element $L_1$ from point P at the intersections of the object planes is fixed at 107.031 mm. and does not vary with the magnification of the system.

The following table more accurately describes the optical system's operation. Distances $X_1$ and $X_4$ in the table are given in inches. $X_1$ again represents the distance from the fixed lens element $L_1$ to the movable lens elements $L_2$ and $X_4$ (see FIG. 1) represents the distance between the movable lens elements $L_2$ and $L_3$ for various angular positions $\theta$ of barrel 16 or 16A. The table also sets forth the magnification MAG for the system for each of the illustrative $\theta$ positions between the minimum and maximum limits of rotation, that is, between 0° and 339°. The table's distances are taken with an object at point P in proper focus.

| MAG | $X_1$ | $X_4$ | $\theta$ |
| --- | --- | --- | --- |
| .7X | .3977 | 1.5230 | 0° |
| 1X | .9622 | 1.4479 | 86¼° |
| 1.5X | 1.3142 | 1.2591 | 142° |
| 2X | 1.4695 | 1.0590 | 186¼° |
| 2.5X | 1.5579 | .8655 | 255¼° |
| 3X | 1.5156 | .6813 | 339° |

A pair of conventional erectors 14 are included in the optical system 8, and one of the erectors is disposed along each optical axis, above the lens element $L_3$ of that axis. The erectors are shown only symbolically since they are well known. The erectors serve to erect the inverted images formed by the optical sub-systems. In general, the optics of the dual eyepieces which can be used in conjunction with the objective system of my invention are well known.

Figure 2:
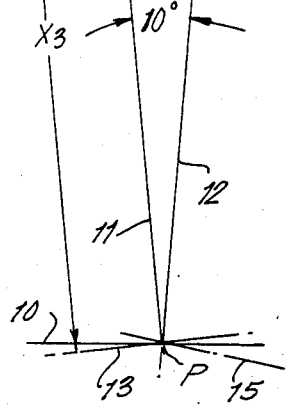
FIG. 2 is a table setting forth the various characteristics of the lens elements illustrated in FIG. 1.

The present invention is directed to the particular combination of lenses in each of the three cemented doublets $L_1$, $L_2$ and $L_3$ along each axis. The problem encountered in variable magnification optical systems for stereomicroscopes, particularly those of relatively inexpensive design and which utilize a minimum number of lens elements, is that it is quite difficult to correct to a desired degree the various aberrations introduced as a result of the continuously movable lenses. I have found that with the particular lens dimensions and characteristics set forth in the table of FIG. 2, a satisfactory degree of correction for the aberrations is achieved for the required specifications for a commercially acceptable instrument despite the fact that each optical system includes only six lenses included in three doublets. In said table, the radii R refer to the various faces of the lenses as shown in FIG. 1 of the drawing and are given in millimeters. The thickness value T for each lens refers to the thickness of the central portion thereof taken along the optical axis of the lens and is also given in millimeters. The refractive indices $N_D$ and dispersions $\nu$ of the lenses are also set forth in the table. Using the lenses defined by the table of FIG. 2, a well corrected system is achieved over the entire magnification range of the objective section of the stereomicroscope from .7 to 3.0.

It will be appreciated that I have provided a variable magnification stereomicroscope objective system wherein the aberrations are well corrected over the entire magnification range, over the desired field and numerical apertures, with the use of a minimum number of lens elements.

What is claimed is:

1. An optical system for the objective section of a stereomicroscope, the system comprising two optical sub-systems, each sub-system having its object plane at essentially a fixed distance from its image plane, each sub-system having a stationary positive lens element, a movable positive lens element and a movable negative lens element along an optical axis, the negative lens element being intermediate the positive lens elements, and means for moving the two movable lens elements along each optical axis in the identical manner at different rates to continuously vary the magnification of the objective system and to hold the image plane fixed, the optical characteristics of the positive lens elements and the negative lens element along each of said optical axes being defined by the following table, with thickness (T) and radii (R) being given in millimeters:

| Lens | $N_D$ | $\nu$ | T | R |
| --- | --- | --- | --- | --- |
| $L_{1A}$ | 1.50795 | 61.1 | 3.537 | $R_1=+35.190$ $R_2=-16.130$ |
| $L_{1B}$ | 1.7506 | 27.8 | 1.618 | $R_3=-29.950$ |
| $L_{2A}$ | 1.7506 | 27.8 | 1.361 | $R_4=-10.177$ $R_5=-6.156$ |
| $L_{2B}$ | 1.50795 | 61.1 | .905 | $R_6=+17.430$ |
| $L_{3A}$ | 1.50795 | 61.1 | 4.657 | $R_7=+90.780$ $R_8=-14.370$ |
| $L_{3B}$ | 1.720 | 29.3 | 1.701 | $R_9=-24.235$ |

2. An optical system for the objective section of a stereomicroscope in accordance with claim 1 wherein the spacing $X_1$, in inches, between the stationary positive lens element and the movable negative lens element along each axis, and the spacing $X_4$, in inches, between the movable positive and negative lens elements along each axis are as follows:

$X_1$:
   1.6156 (when producing high magnification),
   .3977 (when producing low magnification).

$X_4$:
   .6813 (when producing high magnification),
   1.5230 (when producing low magnification).

3. An optical system for the objective section of a stereomicroscope in accordance with claim 1 wherein the mean distance between the stationary lens element and the nearest movable lens element is 1.0067 inches and the mean distance between the movable lens elements is 1.1022 inches.

4. An optical system for the objective section of a stereomicroscope in accordance with claim 1 wherein the optical axes of the sub-systems intersect and the distance between any one of the fixed lens elements and the point of intersection of said two axes is essentially constant and is in the range of 107 mm.

5. An optical system for the objective section of a stereomicroscope in accordance with claim 1 wherein the distance in inches between the fixed lens element and the nearest movable lens element, $X_1$, and the distance in inches between the two movable lens elements, $X_4$, at various magnifications, MAG, are in accordance with the following table:

| MAG | $X_1$ | $X_4$ |
|---|---|---|
| .7X | .3977 | 1.5230 |
| 1X | .9622 | 1.4479 |
| 1.5X | 1.3142 | 1.2591 |
| 2X | 1.4695 | 1.0590 |
| 2.5X | 1.5579 | .8655 |
| 3X | 1.6156 | .6813 |

References Cited

UNITED STATES PATENTS 3,057,259  10/1962  Schuma           350—184

DAVID SCHONBERG, Primary Examiner

ALLEN M. OSTRAGER, Assistant Examiner

U.S. Cl. X.R.

350—227